March 7, 1944. H. F. KOLB 2,343,510
BRAKE MECHANISM
Filed March 24, 1941
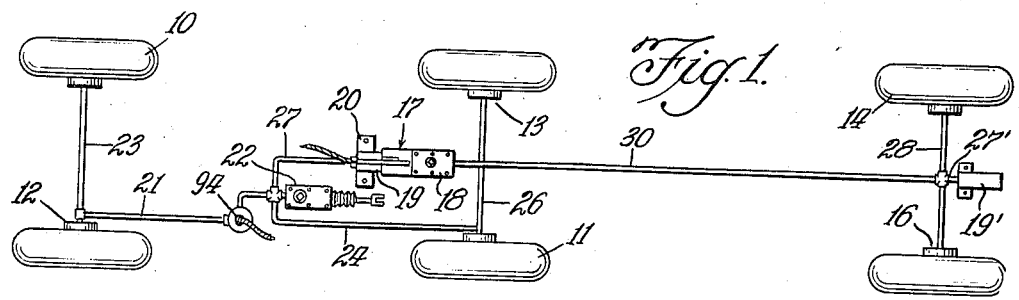
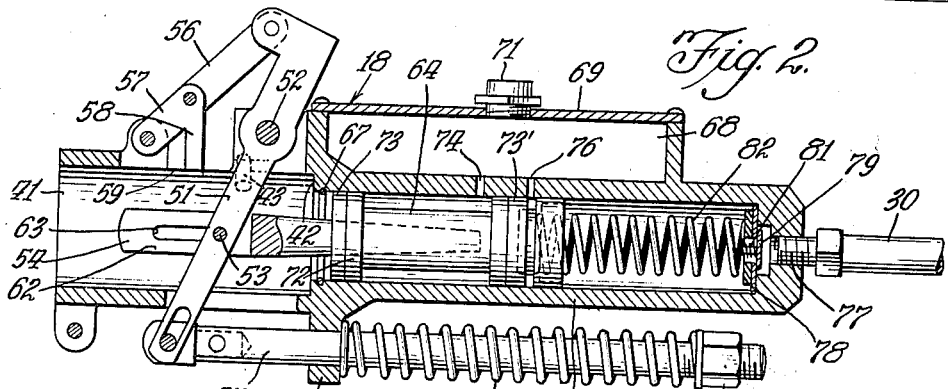
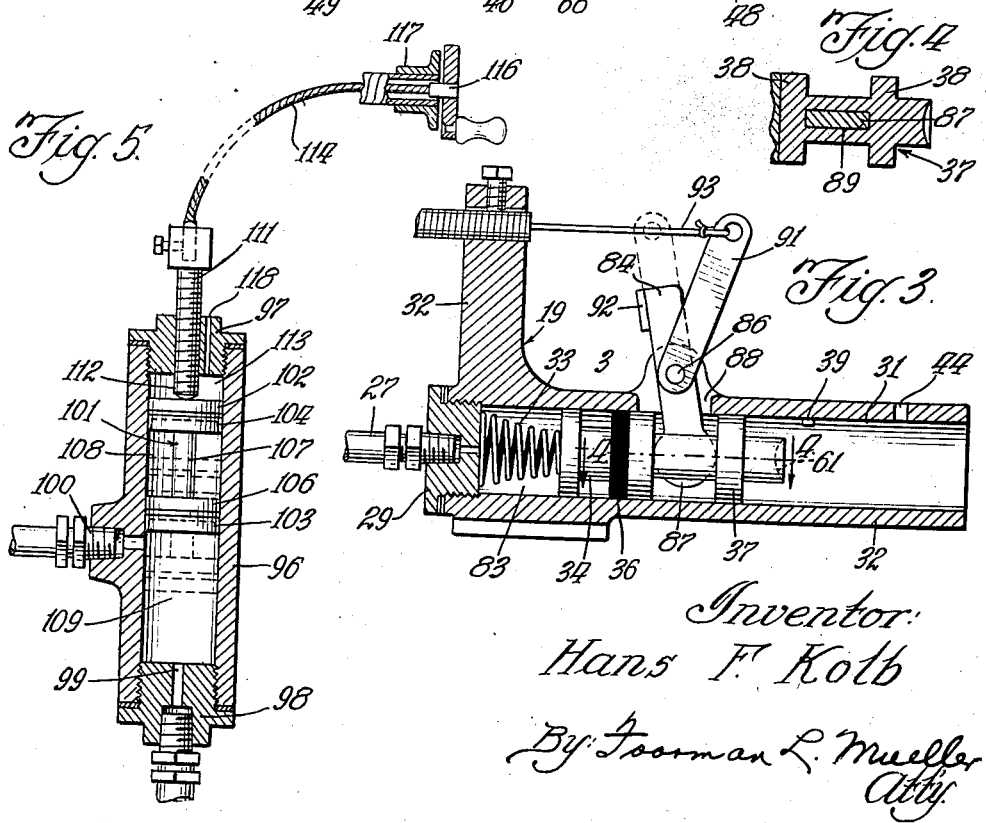
Inventor:
Hans F. Kolb
By Foorman L. Mueller
Atty.

Patented Mar. 7, 1944

2,343,510

UNITED STATES PATENT OFFICE 2,343,510

BRAKE MECHANISM

Hans F. Kolb, Chicago, Ill.

Application March 24, 1941, Serial No. 384,815

5 Claims. (Cl. 188—3)

My invention relates in general to braking systems for moving vehicles and in particular to a braking system of hydraulic type for a motor vehicle. This invention is a continuation in part of my application Serial No. 284,428, filed July 14, 1939, now Patent #2,236,247 issued March 25, 1941.

Since the comparatively recent advent of motorized freighting on a large scale, it has been found desirable to employ trucks having a large capacity both for large volume hauling and economical storage in terminals and the like. In order to speed up transportation and yet hold down the overhead to a minimum, tractor-trailer combinations have been employed with one tractor being used for several trailers. It has been a problem of grave concern to the manufacturers of such combinations to provide adequate braking systems which may be operated from the tractor. In general the braking systems of the prior art for combination vehicle units include a brake unit for each wheel of the combination and a fluid pressure source common to all of such brake units operated by a brake lever in the operator's cab so that all of the brake units are operated at the same time. Under normal operating conditions this operation of the braking system for the tractor and trailer is entirely satisfactory. However, under certain weather conditions, it is objectionable from a safety standpoint to apply the trailer and tractor brakes concurrently. Thus a greater latitude in brake operation and consequent safety is afforded the vehicle operator if he may at his option operate both or only one of the braking systems for the tractor and trailer.

Under inclement road conditions, such as where the road is covered with ice and sleet and in some instances rain, it is well known that skidding occurs largely because of the sliding of the front wheels and their consequent inability to turn the vehicle in a desired direction. It is a recognized fact that if the front wheels of the tractor are able to turn, even though the braking is applied to the rear wheels, that a large part of the skidding will be prevented. In attempts to reduce skidding, the fluid line leading to the front wheel brake units has been plugged to eliminate the operating pressure in the braking system from being applied to the front wheel brake units. Thus on an application of the braking system the rear wheels only are braked while the front wheels are permitted to turn, thus aiding in the steering of the vehicle during braking. This plugging of the front wheel fluid line, however, is seasonal and is generally done early in the fall with the plugs being removed in the spring. It is readily apparent, therefore, that the front wheels are not braked at all during the entire winter, even at such times when there is no ice or sleet on the roads. Thus the increased safety afforded under skidding conditions by permitting the front wheels to rotate is counteracted by the lack of sufficient braking when operating conditions are normal. In order to prepare the braking system for safe operation for certain weather conditions, therefore, the overall efficiency of the braking system is appreciably reduced.

It is an object of my invention, therefore, to provide an improved braking system for moving vehicles.

Yet another object of my invention is to provide a braking system for a moving vehicle in which the braking of the front or steering wheels is simply and immediately controllable at all times at the option of the operator of the vehicle.

It is another object of my invention to provide a braking system for a tractor-trailer combination in which the brakes on the trailer may be applied concurrently with the brakes on the tractor unit, or independently thereof.

A still further object of my invention is to provide a braking system for a tractor-trailer unit which is simple and rugged in construction, operable over a long service life with a minimum of maintenance, and efficient in overall operation to provide for the application of the braking system on the trailer concurrently with or independent of the tractor braking system combined with an optional braking of the front steering wheels on the tractor.

A particular feature of my invention is found in the provision of a braking system of hydraulic type for a moving vehicle in which each wheel has a separate brake unit, with the front wheel brake units being separately connected to a fluid pressure source which is also common to the rear wheel brake units. Valve means in the connecting line for the front wheel brake units are adapted to be controlled from within the operator's compartment to provide for an optional braking of the front wheels on braking of the vehicle.

Further objects, features and advantages of my invention will become apparent from the following description when taken in connection with the accompanying drawing in which:

Fig. 1 is a diagrammatic plan view of a tractor and trailer unit showing the arrangement of my invention thereon;

Fig. 2 is an enlarged longitudinal sectional view of the female portion of the coupling unit between the trailer and tractor unit of Fig. 1;

Fig. 3 is an enlarged longitudinal sectional view of the male coupling portion of the coupling unit diagrammatically illustrated in Fig. 1;

Fig. 4 is a fragmentary sectional view taken along the line 4—4 in Fig. 3; and

Fig. 5 is an enlarged longitudinal sectional view of the valve means illustrated in Fig. 1 and adapted to control the braking of the front wheels of the tractor unit.

In practicing my invention I provide a brake coupling comprising a pair of separable members which for convenience will be called a male unit or member, and a female unit or member, and considering the invention more broadly it is practiced in a complete brake system for a multi-unit vehicle. The male member is rigidly secured to the tractor and connected to the brake system thereof in a tractor-trailer combination, while the female member is connected to the braking system of the trailer. The female member fits over the male member and when in operating position is locked against movement relative thereto by suitable locking means. The male unit has a plunger therein which is operated by a brake lever in the operator's compartment of the tractor. This plunger is in operative engagement with a similar plunger in the female member, so that as the plunger in the male member is moved by the application of the brakes on the tractor, the plunger in the female member is moved to apply the brakes of the trailer unit. Other brake lever means are located in the cab of the tractor and are operatively connected with the plunger in the male member to move this plunger and apply the brakes of the trailer unit independently of the application of the brakes of the tractor.

The braking system in the tractor further includes valve means arranged in the fluid system therein between the brake units for the front steering wheels and the means for concurrently applying a fluid pressure to all of the brake units on the tractor, the valve means being operable to control the application of the fluid pressure on the front wheel brake units when the braking system of the tractor is actuated. Operating means for the valve means includes an actuating portion which is arranged within the operator's compartment of the tractor so that the braking of the front wheels on actuation of the tractor braking system is entirely optional with the operator of the vehicle.

Referring to the drawing there is diagrammatically shown in Fig. 1 a tractor or pulling unit having front wheels 10 and rear wheels 11 provided with brake units 12 and 13, respectively. The trailer or following unit is illustrated as having wheels 14 with brake units 15. Each of the trailer and tractor units has a corresponding braking system which are operatively coupled together by a coupling unit generally indicated at 17 and comprising essentially two main elements, a female member 18 (Fig. 2) and a male member 19 (Fig. 3). As shown in Fig. 1 the male member 19 is rigidly secured to a suitable portion 20 of the tractor frame means. If there are more than two units in the train a male member is mounted on the rear of each unit, as indicated at 19', inasmuch as the complete brake coupling between any two units requires a male member on the pulling unit and a female member on the following unit. As is shown in Fig. 1 the fluid lines for the braking system of the tractor unit include a lead line 21 from a master brake fluid cylinder 22 connected with a fluid line 23 common to the front wheel brake units 12, a second lead line 24 from the cylinder 22 being connected with a fluid line 26 common to the rear wheel brake units 13. A third lead line 27 from the master cylinder 22 is connected with the male member 19 of coupling unit 17, the female coupling member 18 being connected by a fluid line 30 to a fluid line 28 common to the brake units 16 for the trailer wheels. As will be understood by those familiar with the art, with the coupling members 18 and 19 in their coupled position a braking pressure is applied concurrently to all of the brake units on an increase in the fluid pressure in the master brake cylinder. This increase in pressure is accomplished by a suitable brake lever (not shown) arranged in the operator's compartment of the vehicle.

The embodiment of the male member of my coupling as shown in Figs. 1 and 3 is connected directly into the system of tubes for the hydraulic brake system through the fluid line 27 above mentioned, which is threadably secured in a plug 29 at one end of a longitudinally extending cavity 31 formed in the casing 32 of the male member. With reference to the male member 19' illustrated in Fig. 1 as attached to the trailer unit, the lead line is indicated as 27' and connected with the fluid line 28. The cavity 31 is open at its opposite end to allow operative engagement between the male and female members as will be hereinafter explained. A normally extended spiral spring 33 is positioned at the plugged end of the cavity 31 and extends inwardly thereof. The extended end of the spring 33 is capped by a metal member 34 the diameter of which is substantially equal to that of the cavity 31. The cap 34 is provided as a guide for the extended end of the spring 33 so that said end will not fall to the bottom of the cavity 31. Abutting the metal cap 34 is a rubber disc 36 which in turn abuts an actuating plunger 37. For guiding the plunger 37 in a straight line movement there is provided a pair of guide plates 38 substantially equal in diameter to that of the cavity 31. The rubber disc 36 acts as a sealing member to keep the braking fluid behind the disc or to the left as viewed in Fig. 3. Upon application of the brakes, the braking fluid is forced from the master cylinder through the tube 27 into the fluid compartment 83 thus forcing the actuating piston 37 to the right as viewed in Fig. 3. Fig. 3 shows the piston 37 in the position it would take when the male member and the female member are coupled in operative position and with the brakes on the tractor applied. Since the spring 33 tends to push outwardly on the plunger 37 at all times, a stop portion 39 is provided in the cavity 31 of the male member to limit such movement when the two members are uncoupled.

The female member 18 illustrated in detail in Fig. 2 has a cavity 41 therein which is open at one end so that the female member may be fitted over the male member. The inner diameter of the cavity 41 is only slightly larger than the outer diameter of the male member so as to provide for a reasonably close fit therewith. As the female member is positioned over the male member the male member rests against a shoulder 42 at the inner end of the cavity 41.

When the two members are in this coupled position, a locking pin 43 projects through the female casing and into a hole 44 of the male casing 32 so as to lock the female member against movement relative to the male member. The female member of my coupler is constructed so that upon uncoupling of the male and female members the mechanism of the female member will be automatically actuated to apply the brakes to which the female member is connected as on a trailer. This actuating mechanism includes a spring 46 mounted on a rod 47 intermediate a nut 48 and a projection 49 of the casing on the female member. The rod 47 is pivotally linked for relative slidable movement to the lower end of an internal arm 51 which extends across the cavity 41 and through the female member 18. The upper end of the arm is pivotally connected by a pin or axis means 52 to the casing of the female member. A pin or extension 53 substantially intermediate the ends of the arm 51 is slidably connected to a peg 54 as will be hereinafter explained.

Pivotally linking the upper end of the arm 51 to the casing of the female member is a straight link 56 and an inverted V-shaped link 57 pivotally connected thereto. The link 57 is provided with a leg 58 which, when the two members are in coupled position extends through an opening 59 in the casing of the female unit and rests on the outside of the casing on the male unit. The female member is shown in coupled position in Fig. 2 although the male member is not actually positioned in the cavity 41. As the two member are uncoupled the spring 46 drives the rod 47 to the right as viewed in Fig. 2, pivoting the arm 51 in a counter-clockwise direction to in turn pivot the leg 58 of the link 57 into the cavity 41, thus making it impossible to recouple the two coupling members until the leg 58 is removed from the cavity 41.

The outside mechanism on the female member is connected to the inside brake-actuating mechanism by means of the peg 54, previously mentioned, which operates the inside mechanism to apply the brakes on the trailer, both when the two members are coupled as well as uncoupled. When coupled the end of the peg 54 is positioned in the cavity 61 of the plunger 37 of the male member and in the coupling operation moves the plunger 37 to the left from the stop portion 39 as shown in Fig. 3. The peg 54 is bifurcated at one end and provided with a pair of identical legs 62 straddling the arm 51 while the pin 53 is slidably carried in corresponding slots 63 in the legs. When the two members are in coupled operative position and the brakes are released, the arm 51 rests against the right end (as viewed in Fig. 2) of the slots 63 in the peg 54. In this position the plunger 37 is urged against the end of the peg by the spring 33 under compression.

More particularly as to the fluid carrying portions of the female member the peg 54 is rigidly secured in a cavity formed in a piston or plunger 64 carried in a cylinder 66 formed at one end of the female member. The inside diameter of the cylinder 66 is smaller than the inside diameter of the cavity 41 so that the annular shoulder 42 for receiving the end of the male member 19 is provided. The plunger 64 is limited in its movement to the left as viewed in Fig. 2 by means of a snap ring 67 fitted in a recess at one end of the cylinder 66. Excess brake fluid is stored in a tank 68 integral with the casing or housing for the female member and provided with a fluid-tight removable cover 69. The volume of fluid in the tank 68 varies in accordance with the position and operation of the brakes in operative connection with the plunger 64 and in order that the air in the tank 68 may be equalized with the variation volume of brake fluid an ordinary air vent 71 is provided in the tank cover 69.

The plunger 64 is provided with side plates 72 having corresponding sealing discs 73 and 73' which prevent the brake fluid from leaking from the cylinder 66 so that there is no loss of brake fluid during the operation of the complete coupled brake system from the female member when it becomes uncoupled from the male member of the complete system. The tank 68 is connected with the cylinder 66 by means of a pair of ports 74 and 76 extending through the cylinder wall and positioned so that the brake fluid passes either to or from the tank 68 depending upon the position of the plunger and the two sealing discs 73 and 73'. The hydraulic braking system on the trailer or following unit to which the female member is connected is connected with the cylinder 66 by the lead line 30 which is of flexible or tubular construction and provided with a threaded nipple for threadable connection with an aperture 77 in the end of the cylinder. The cylinder at its apertured end is opened or closed depending upon the operation of a plunger 64 by means of an inlet valve 78 and a cooperating outlet valve 79 normally urged to a closing position by a spring 81. Intermediate the inlet valve 78 and the inner end of the plunger 64 is a spring 82 normally under some compression and acting to hold the plunger 64 at the left hand end of the cylinder 66 in the position shown in Fig. 2. When the plunger is moved to the right for operating the brakes on the trailer unit, the spring 82 maintains the inlet valve 78 against the end of the cylinder 66.

In the coupling of the coupling units 18 and 19 the arm 51 is pivoted upwardly to lift the leg member 58 out of the cavity 41, and the member 18 is inserted over the stationary member 19 in a telescopic connection. In this position the plunger 37 is in engagement with the end of the peg 54 and the locking pin 43 is in locking engagement with the male member at the aperture 44. With a hose or tube 27 connected into the hydraulic brake system on the tractor unit, the brake fluid passes through the tube into the fluid compartment 83 when the usual foot or hand-operated brake lever on the tractor is actuated. The fluid is forced against the plunger 37 to move it outwardly as was previously mentioned. This movement is transmitted through the peg 54 to the plunger 64 of the female member to in turn move this plunger against the action of the spring 82. Since the arm 51 cannot move when the male and female members are coupled by reason of the V-shaped link 57 connecting the male member, peg 54 and plunger 64 move independently of the arm 51 within the limits of length of the slots 63, which length corresponds in general to the distance between the stop 39 on the male member housing and the plate 38 on the plunger 37. On movement of the plunger 54 to the right, as viewed in Fig. 2, the disc 73' cuts off the port 76 into the fluid tank 68, so that the only possible outlet for the fluid to the right of the disc 73' in the cylinder 66 is through the outlet valve 79 and thence to the brake units in the trailer thereby applying said brakes. As the brake control lever or pedal in the tractor is released the plunger 64 is moved back to the position shown in Fig. 2 by the action of the spring 82. As the spring pressure on the inlet valve 78 is lessened the fluid pressure on the opposite side becomes relatively greater and forces the valve 78 to open to admit the brake fluid back into the portion of the cylinder 66 to the right of the disc 73'. If air should get into the cylinder 66 the brake control lever or pedal is pushed down and released several times to pump more fluid through the ports 74 and 76 and into the compression chamber portion of the cylinder 66 to the right of the plunger 64.

Upon a release of the locking pin 43 the male and female members may be separated. On pulling of the female unit away from the male unit the leg 58 of the V-shaped link is no longer supported on the male member and the arm 51 is pivoted in a counter-clockwise direction as viewed in Fig. 2, under the pressure of the spring 46 which is released. Arm 51 drives the pin 53 against the right end of the slots 63 which in turn drives the plunger 64 to increase the fluid pressure in the connecting lines 30 and 28 to the brake units 16 of the trailer, thereby bringing the trailer to a stop. This operation of the braking system is particularly advantageous if the trailer is in motion at the time it is uncoupled from the tractor, since it will not only stop the trailer and possibly avoid considerable damage as can be understood, but the force of the spring 46 will act to retain the brakes in applied position to hold the trailer for an indefinite period of time.

In the operation of my invention as described above, it is seen that the braking systems for the trailer and tractor are concurrently applied on increasing the pressure in the master cylinder by a suitable brake or hand lever, (not shown) located in the operator's compartment. Under some conditions of vehicle operation, however, as on grades, it is desirable to apply the brakes on the trailer without applying the brakes on the tractor. In order to accomplish this application of the braking system for the trailer independently of the tractor-braking system, there is provided on the male member 19 a lever 84 pivotally connected by a pin or axis means 86 to the casing 32 of the male member and having a portion 87 thereof extending into the cavity 31 through an opening 88. The portion 87 is of rounded or arcuate contour and is adapted to be inserted in an opening 89 (Fig. 4) extending radially through the plunger 37 and between the side plates 38. Thus on movement of the plunger 37 within the cavity 31 the lever 84 is pivotally moved about the pin 86. Conversely actuation of the lever 84 serves to move the plunger 37 independently of any increase in the pressure in fluid compartment 83. Also pivotally connected at one end to the pin 86 is an actuating lever 91, its opposite end being suitably connected through cable means 93 or the like to a supplementary brake lever, (not shown) located in the operator's compartment and separate from the brake lever used in concurrently applying the braking systems of the tractor and trailer.

The relative position of the levers 84 and 91 when the lever 91 is in an inoperative or rest position, and the lever 84 is in a position corresponding to an operating position of the plunger 37 when the braking systems for the tractor and trailer are concurrently applied is shown in full lines in Fig. 3. On movement of the cable 93 to the left, as viewed in Fig. 3, the lever 91 engages the projection or ear 92 of lever 84 and pivotally moves the lever 84 in a counter-clockwise direction to the relative position indicated in full lines for the lever 84 and dotted lines for the lever 91. As a result of movement of the lever 91 the piston 37 is moved to its operating position to in turn actuate the trailer braking system independently of the actuation of the tractor braking system. By virtue of this assembly of the coupling unit 17 the braking systems for the tractor and trailer units may be concurrently applied for normal operation, or the trailer braking system may be applied independently of the tractor braking system by merely operating the supplementary braking lever which actuates the lever 91.

As was previously mentioned it is particularly desirable in the reduction of skidding that the front wheels 10 of the tractor be permitted to rotate even though the brakes on the rear wheels 11 are set. Also, when the conditions for skidding are not present it is desirable that all of the wheels be set on braking so that the braking system for the tractor is operated with maximum safety under all weather conditions. In accomplishing this manner of braking operation there is provided valve means indicated generally as 94 (Fig. 1) and connected in the fluid line 21 leading from the master cylinder 22 to the fluid line 23 for the front wheel brake units 12. As shown in detail in Fig. 5 this valve includes a cylindrical body portion 96 having a plug 97 closing one end thereof and a plug 98 closing the opposite end thereof. Plug 98 is formed with an aperture or inlet 99 adapted to threadably receive that portion of the lead line 21 which is connected with the master cylinder 22. A fluid outlet 100 is formed intermediate the ends of the cylinder 96 and is threadably connected with that portion of the lead line 21 connected to the fluid line 23. Operatively associated with the cylinder 96 and movable axially therein is a piston unit 101 having end guide plates 102 and 103 provided with sealing discs 104 and 106, respectively. The end plates 102 and 103 are connected by an axially extending portion 107 so that a space or compartment 108 is formed within the cylinder 96 and between the end plates 102 and 103.

The compartment 108 and the compartment 109 which is formed between the end plate 103 and the plug 98 are normally filled with fluid. As is shown in Fig. 5 the piston 101 in its full line position permits fluid communication between the inlet 99 and the outlet 100 so that any increase in fluid pressure by the master brake cylinder 22 is transmitted through the lead line 21 for application to the front wheel brake units 12. On movement of the piston 101 downwardly, as viewed in Fig. 5 to its dotted line position, the sealing disc 106 is moved across the outlet 100 so as to prevent fluid communication between the inlet 99 and the outlet 100. Thus with the piston 101 in its dotted line position any increase in the fluid pressure in the master cylinder 22 is ineffective to operate the front wheel brake units 12.

Movement of the piston 101 to its dotted line position is accomplished by means of a driving screw 111 which is threaded through the plug 97 and movable axially of the cylinder 96. The end 112 of the screw 111, which extends within the cylinder, is in abutting engagement with the end plate 102 of the piston 101. Rotation of the screw 111 in one direction drives the piston 101 downwardly to its dotted line position. When it is desired to brake the front wheels 10 the piston 101 is permitted to be moved upwardly to its full line position by rotating the screw 111 in an opposite direction, the fluid pressure in the fluid compartment 109 serving to move the piston upwardly while the end 112 functions as a stop to limit this upward movement.

With the piston 101 in its dotted line position the fluid compartment 108 is in communication with the outlet 100. The fluid in this compartment prevents any air from the air space 113 between the end plate 102 and plug 97 from passing into the outlet 109 so that any air binding of the lead line 21 and connecting line 23 to the brake units 12 is entirely eliminated. It is obvious, of course, that should any air pass into the outlet 100 at such times when the front wheels 10 are not being braked, that later communication of the inlet 99 and outlet 100 with the fluid compartment 109 would not immediately prepare the fluid lines 21 and 23 for transmittal of the pressure from the master cylinder 22. In other words, this air on operation of the master cylinder would merely be compressed thus rendering the brake units 12 inoperative. The fluid compartment 108, therefore functions to keep the connecting lines between the master cylinder 22 and brake units 12 entirely free of air so that the brake units 12 may be positively operated on movement of the piston 101 from its dotted line position to its full line position.

In the movement of the piston 101 to its outlet closing position it is contemplated that the screw 111 be operatively connected at one end with a flexible cable 114 or the like and at its opposite end to a hand lever or crank 116 which is rotatably supported in a portion 117 on the dashboard of the motor vehicle, for convenient manipulation by the operator. It is apparent, therefore, that rotation of the crank 116 in one direction moves the piston 101 to its dotted line position, while its rotation in an opposite direction rotates the screw 111 outwardly from the cylinder 96 to permit an upward movement of the piston to its full line position by the pressure of the fluid in the compartment 109. The operation of the control means 94 to provide for the braking or non-braking of the front wheels 10 on braking of the tractor is thus entirely optional with the operator of the vehicle, with the change being simply and quickly made by manipulating the crank 116. It is to be understood, of course, that the piston 101 may be operated by other means such as a slidable member inserted within the plug 97, with slidable movement of this member being accomplished through a Bowden wire or the like (not shown). In the travel of the piston 101 in the cylinder 96 appreciable air pressure might be built in the space 113. To prevent any building up of pressure in this space there is provided an air bleeder 118 in the plug 97.

My invention thus provides a braking system of fluid pressure type for a trailer-tractor combination which is of simple and rugged construction and adapted for positive and efficient operation under all weather conditions. The braking system of the trailer unit may be applied independently of the braking system for the tractor unit or concurrently therewith, depending upon the desires of the operator of the vehicle. Valve means in the fluid system connecting the front wheel brake units with the master brake cylinder provides for an immediate control of the braking action of the brake units 12 with such control also being optional with the vehicle operator. This alternative control of the braking of the front whels in combination with the varied operation of the trailer and tractor braking systems, provides in all a braking system which may be operated in any one of a plurality of ways depending upon the kind of braking required. A maximum safety for motor vehicle operation is thus obtained under all kinds of weather conditions.

Although my invention has been described and illustrated with reference to a single embodiment thereof, it is to be understood that it is not to be so limited since the parts and their arrangement may be changed in a manner which is within the intended scope of my invention as defined by the appended claims.

I claim:

1. In a train combination including a pulling unit and a following unit for coupling together, and each of said units having a brake system thereon, a female member on the following unit including a housing with a cavity therein, piston means in said cavity, a male member on said pulling unit including a body portion with a lateral extension thereon, said lateral extension having a longitudinal cavity therein, other piston means in said longitudinal cavity operatively connected with the brake system on said pulling unit and adapted to be driven upon actuation of said pulling-unit-brake system, with said lateral extension fitting into the cavity in said female member for coupling thereto, and with said other piston means being in operative connection with said first piston means upon the coupling of said male and said female member so that said following-unit-brake system is actuated on actuation of said pulling-unit-brake system, and manually operated means operatively connected with said other piston means to provide for an actuation of said following-unit-brake system independently of said pulling-unit-brake system.

2. A coupling for two normally independent hydraulic braking systems including a coupling portion operatively connected to one of said braking systems, and a second coupling portion operatively connected to the other of said braking systems, piston means on said one coupling portion for operating said one braking system, other piston means on said second coupling portion operatively connected with said other braking system, means operatively connecting said two piston means for concurrent movement in one direction, said other piston means on operation of said other braking system being moved in said one direction to concurrently operate said one braking system, means for selectively operating said one braking system including a pivoted link member operatively connected at one end with said other piston means and having a catch portion at the opposite end thereof, a manually actuated pivoted member movable into locked engagement with said catch portion to pivotally move said link member therewith, and means pivotally supporting said two pivoted members on said second coupling portion, with said pivoted link member on being moved by said manually actuated member in turn moving said other piston means in said one direction.

3. A coupling for two normally independent braking systems including a coupling portion operatively connected to one of said braking systems, piston means in said coupling portion for operating said one braking system, a second coupling portion operatively connected to the other of said braking systems, other piston means in said second coupling portion movable in response to an operation of said other braking system, third piston means in said second coupling portion located intermediate said first two piston means and separably connectible with said first-named piston means, with all of said three piston means being movable along a common axis, said other piston means on operation of said other braking system being moved into engagement with said third piston means to in turn move said one piston means to concurrently operate said one braking system, and manual means for operating said one braking system independently of said other braking system and including a pivoted lever provided with an end loosely connected with said third piston means at a point substantially coincident with said common axis.

4. In combination with a pulling vehicle and a following vehicle which are respectively provided with first and second fluid braking systems, an actuating device on said pulling vehicle provided with a first piston which is operative in response to operation of said first braking system, a brake operating device adapted for detachable connection with said actuating device and connected with said following vehicle, said brake operating device including a second piston which is operative to effect the operation of said second braking system, said actuating device, when connected with said brake operating device, including a part for operating said second piston in response to operation of said first piston, whereby said braking systems are concurrently operated, means included in said brake operating device and responsive to detachment of said devices for automatically operating said second piston, thereby to operate said second braking system, and additional manually operable means carried solely by said pulling vehicle and including a final link connected with said part for selectively operating said second piston at will, thereby selectively to operate said second braking system independently of said first braking system and without detachment of said devices.

5. In combination with a pulling vehicle and a following vehicle which are respectively provided with first and second fluid braking systems, an actuating device on said pulling vehicle provided with a first piston which is operative in response to operation of said first braking system, a brake operating device adapted for detachable connection with said actuating device and connected with said following vehicle, said brake operating device including a second piston which is operative to effect operation of said second braking system, said actuating device, when connected with said brake operating device, including a part for operating said second piston in response to operation of said first piston, whereby said braking systems are concurrently operated, and manually operable means carried solely by said pulling vehicle and including a final link connected with said part for selectively operating said second piston at will, thereby to operate said second braking system without operating said first braking system and without detachment of said devices.

HANS F. KOLB.